(No Model.)
T. H. SPEAKMAN.
LEVER SCREW FOR HOLDING WEIGHT LEVERS OF ROLLS OF SPINNING MACHINES.
No. 316,197. Patented Apr. 21, 1885.
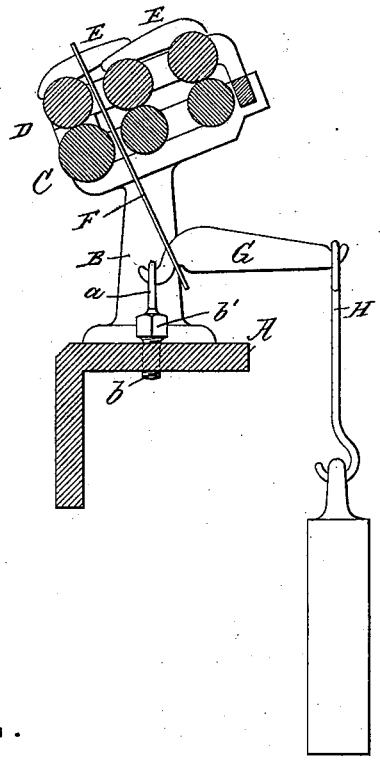
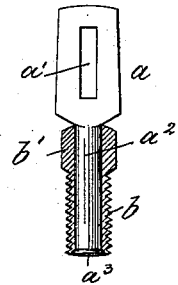
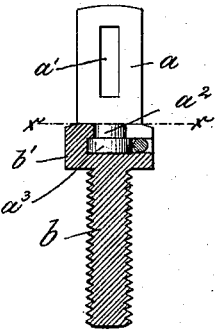
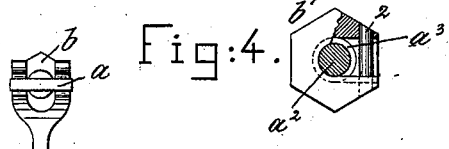
Witnesses.
Arthur Tipperton.
John F. C. Prinkist
Inventor
Thomas H. Speakman
by Crosby & Gregory Attys.

United States Patent Office.

THOMAS H. SPEAKMAN, OF WARE, ASSIGNOR TO GEORGE DRAPER & SONS, OF HOPEDALE, MASSACHUSETTS.

LEVER-SCREW FOR HOLDING WEIGHT-LEVERS OF ROLLS OF SPINNING-MACHINES.

SPECIFICATION forming part of Letters Patent No. 316,197, dated April 21, 1885.

Application filed December 22, 1884. (No model.)

*To all whom it may concern:*

Be it known that I, THOMAS H. SPEAKMAN, of Ware, county of Hampshire, State of Massachusetts, have invented an Improvement in Lever-Screws for Holding Weight-Levers of Rolls of Spinning-Machines, of which the following description, in connection with the accompanying drawings, is a specification, like letters on the drawings representing like parts.

The saddles which rest upon the journals of the upper rollers of roller-stands to keep the top rolls to their work, are weighted or held down by a stirrup, which at its lower end, below the bottom rolls, receives upon it a lever, the short arm of which takes its fulcrum in a lever-screw, while the long arm of the said lever is held down by a hook upon which is added a weight, or which is kept down in other ways, whereby the said lever may be made effective to keep the saddles and top rolls down.

In spinning-machines as now constructed the levers holding the weights that act to keep the top rolls down in place are located quite near the top board, and in spinning, owing to the wear of the rolls or saddles and other causes, it sometimes happens that the long arm of the said lever comes down to and rests on the top board. Thereafter the weights fail to be fully effective on the stirrup or top rolls, which results in the manufacture of poor yarn. To overcome this difficulty in ordinary spinning-machines, it is necessary to adjust the lever-screw engaged by the short end of the lever, and to do this with lever-screws as now made it is customary to remove the weight from the lever, the lever from the stirrup, the stirrup from the saddle, and the saddles from the rolls, and lay the saddles aside, after which the lever-screw is turned, and it must be turned at least a full half-turn, and in the adjustment of the screw to the proper height the slot in it is apt to be so left as to throw the lever out of proper direction or line, and it frequently is very difficult or quite impossible to adjust the lever-screw with perfect accuracy.

There are quite a number of lever-screws in line in each machine, and when made as ordinarily it is quite impossible to adjust them all to the same height, so as to hold their levers all at the same level, and further, with the ordinary lever-screw very much valuable time is lost in dismembering the different parts of the roller-head.

In accordance with my invention the head of the lever-screw and the threaded shank thereof are made in two parts, the foot of the said head being swiveled or loosely connected with and so as to turn in the said shank. To adjust my improved lever-screw, it is only necessary to apply a wrench to the head of and turn the screw-threaded shank, the said head being raised or lowered according to the direction in which the said shank is turned; but the head is not rotated during such rotation of the shank, and hence the end of the lever may be kept in engagement therewith, and the lever may have as much or as little adjustment as is required.

Figure 1 in section represents a sufficient portion of a spinning-frame to illustrate the application of my invention thereto. Fig. 2 is an elevation of my improved lever-screw, the screw-threaded shank being in section. Fig. 3 is a like view of a modified form of lever-screw; Fig. 4, a section thereof below the line $x\,x$, part of the top of the head of the threaded shank being broken out, and Fig. 5 is yet another modification.

The top board, A, roller-stand B, bottom rolls, C, top rolls, D, saddles E E, stirrup F, lever G, weight-hook H, and weight I to retain the longer arm of the lever down are all as usual.

My improved lever-screw is composed of a head, $a$, slotted at $a'$ and having a foot, $a^2$, the said foot being held loosely or swiveled in a screw-threaded shank, $b$, provided with a head, $b'$, to enable it to be engaged and rotated by a wrench or tool, as bolts are commonly engaged and turned. The head shown in Fig. 1 is square, but the one shown in Figs. 3 and 4 is hexagonal, heads of such or other usual irregular shapes being easily caught by a wrench.

In the lever-screw shown in Figs. 1 and 2 the foot $a^2$ of the slotted head is extended entirely through the hollow center of the threaded shank, below which it is upset or spun out to form a flange, $a^3$, which fits the inwardly beveled lower end of the shank.

The lever-screw represented in Figs. 3 and 4 has a flange, $a^3$, which is formed before the head and shank are connected, and the top and side of the head of the shank, as shown, are provided with an undercut slot or groove to receive the said flange, the foot of the head $a$ being placed loosely therein, where it is retained by the pin 2.

As an obvious equivalent of the lever-screw shown in Fig. 2, the head $a$ might be made T shape, as shown in Fig. 5, and the end of the lever G be forked, as shown, to engage the said head.

I claim—

1. The lever-screw composed of the lever-holding head, and a screw-threaded shank having a head which may be engaged to rotate the screw, the lever-holding head being loosely connected to the threaded shank, to operate substantially as described.

2. The roller-stand, rolls therein, saddles, stirrups, and lever G, combined with the lever-screw, having its engaging-head loosely connected with its screw-threaded and headed shank, to operate substantially as described.

In testimony whereof I have signed my name to this specification in the presence of two subscribing witnesses.

THOMAS H. SPEAKMAN.

Witnesses:
EDWIN H. BAKER,
GEO. E. TUCKER.